April 2, 1957 E. G. MELROE 2,787,477
FOLDING DRAWBAR AND TRANSPORT
Filed Oct. 19, 1954 2 Sheets-Sheet 1
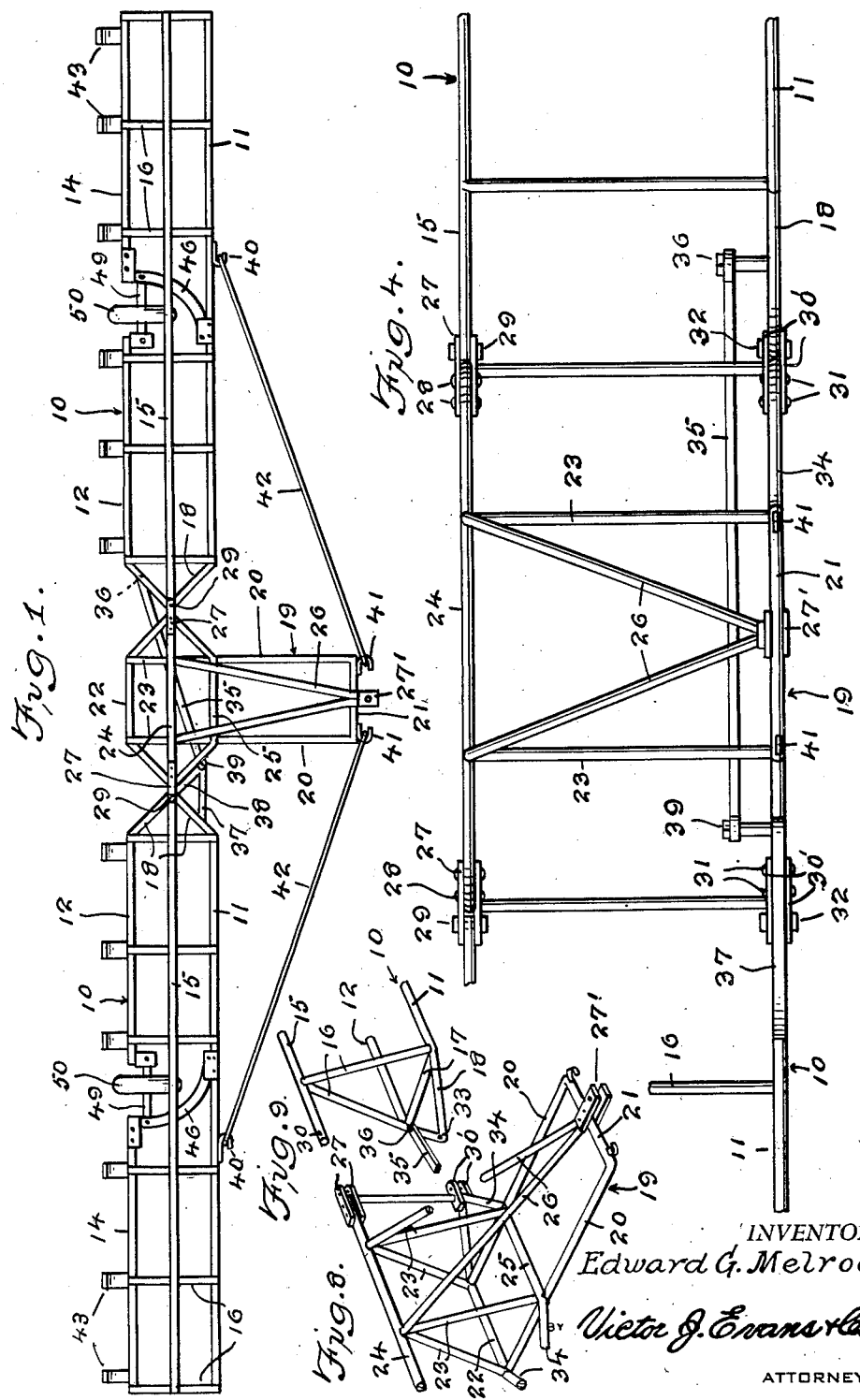
INVENTOR.
Edward G. Melroe
By Victor J. Evans & Co.
ATTORNEYS

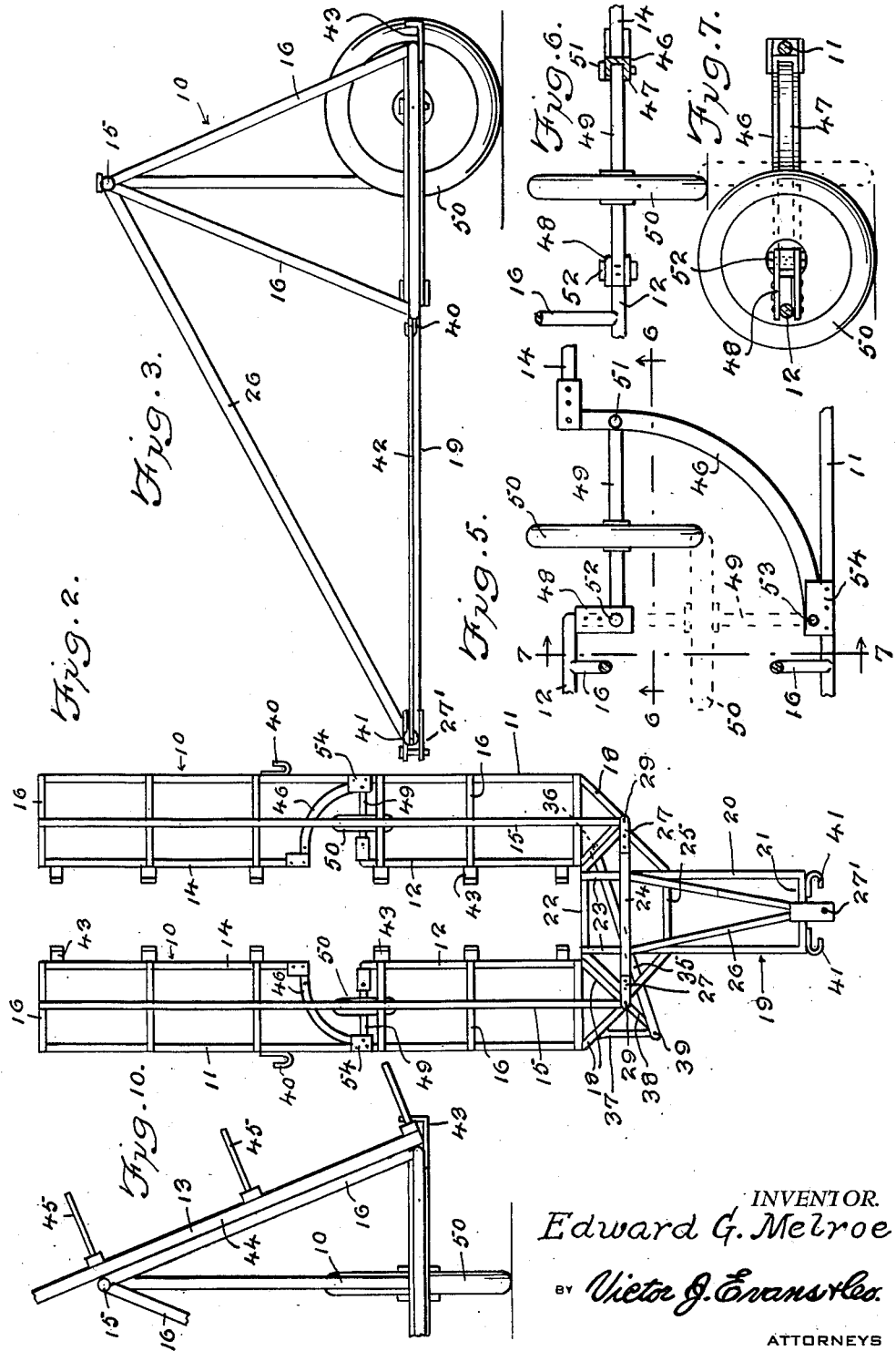

United States Patent Office 2,787,477
Patented Apr. 2, 1957

2,787,477

FOLDING DRAWBAR AND TRANSPORT

Edward G. Melroe, Gwinner, N. Dak.

Application October 19, 1954, Serial No. 463,173

5 Claims. (Cl. 280—476)

This invention relates to agricultural equipment, and more particularly to a folding drawbar and transport.

The object of the invention is to provide a mobile folding drawbar and transport which can be used for pulling various types of equipment along a field such as harrow sections, spraying equipment, flexible tooth drag harrow sections, and wherein the drawbar and transport can be folded to occupy a minimum amount of space when the articles are being carried from place to place or when the drawbar is being moved from one locality to another.

Another object of the invention is to provide a folding drawbar and transport which in its open or extended position provides a means for dragging or towing various types of conventional equipment such as harrow sections, and wherein when the assembly is to be moved to a different locality, the device can be folded to occupy a minimum amount of space to facilitate the movement thereof and with the device in folded position the harrow sections or other articles can be conveniently supported thereon to facilitate the carrying or transporting thereof.

Another object of the invention is to provide a folding drawbar and transport which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view showing the drawbar and transport in open position whereby harrow sections or other equipment can be dragged along a field being worked.

Figure 2 is a top plan view similar to Figure 1 but showing the sections in closed position as when the device is to be moved to a different locality.

Figure 3 is a side elevational view and with the sections in open position.

Figure 4 is a fragmentary front elevational view of the folding drawbar and transport of the present invention.

Figure 5 is a fragmentary plan view showing one of the adjustable wheel mountings whereby the wheel can be adjusted to be in alignment with the direction of movement of the device.

Figure 6 is a sectional view taken on the line 6—6 of Figure 5.

Figure 7 is a sectional view taken on the line 7—7 of Figure 5.

Figure 8 is a fragmentary perspective view showing the base and hinge connections between the base and side sections.

Figure 9 is a fragmentary perspective view of one of the sections showing an end thereof.

Figure 10 is an end elevational view of one of the sections, with parts broken away and in section, and showing a harrow section supported thereon so that the harrow section can be readily transported to any desired location.

Referring in detail to the drawings, the folding drawbar and transport of the present invention includes a pair of similar sections 10 which are mounted for movement towards and away from each other, as shown in Figures 1 and 2. With the sections 10 in the extended position as shown in Figure 1, harrow sections or other equipment can be towed along a field being worked, and with the sections 10 in the closed position as shown in Figures 2 and 10, the device can be readily moved from place to place and at the same time articles such as the harrow sections 13 can be supported or transported by the device.

Each of the sections 10 has the same construction and each includes a lower longitudinally extending beam 11 and a pair of aligned bars 12 and 14. The bars 12 and 14 lie in the same horizontal plane as the beam 11. Positioned above and centrally of the bars and beam is a horizontally disposed longitudinally extending rod 15. A plurality of angularly arranged or converging braces 16 extend between the rod 15 and the bars 12 and 14 and the beam 11 whereby the parts will be maintained in their proper assembled relation. Horizontally disposed arms 17 extend between the beam 11 and the bars 12 and 14 and are secured thereto, and the arms 17 also help to reinforce the sections 10.

Extending from the inner or front end of each of the sections 10 and secured to the lower end thereof is a triangular shaped bracket 18, Figure 9, for a purpose to be later described. There is further provided a base as indicated generally by the numeral 19, and the base 19 is arranged between and forwardly of the pair of sections 10. The structure of the base 19 is shown clearly in Figure 8, and includes a pair of spaced parallel side members 20 which are interconnected together by end members 21 and 22. Angularly arranged fingers 23 extend upwardly from the base 19 and are secured thereto, and a horizontally disposed body member or bar 24 is secured to the upper ends of the fingers 23 in any suitable manner, as for example by welding. Extending between the pair of side members 20 and secured thereto is a crosspiece 25, and a pair of inclined angularly arranged braces 26 extend between the body member 24 and the end member 21 and are secured thereto. A hitch 27' extends forwardly from the end member 21 of the base 19, and the hitch 27' is adapted to be connected to a suitable towing vehicle such as a tractor.

A means is provided for pivotally connecting the base 19 to each of the pair of sections 10. This means comprises hinge plates 27 which are arranged in pairs, and the hinge plates 27 may be secured to the projecting ends of the body member 24 by suitable securing elements such as rivets or bolt and nut assemblies 28, Figure 4. A pivot pin 29 extends through registering apertures in the plates 27, and the pivot pin 29 also extends through an aperture or opening 30 in the projecting end of the rod 15, Figure 9. Similarly, a triangular shaped bracket 34 extends outwardly from each side of the base 19 and is secured thereto, and a pair of lower plates 30' are secured to the bracket 34 in any suitable manner, as for example by means of rivets 31. A pivot pin 32 extends through the registering apertures in the plates 30' and through a registering opening or aperture 33 in the triangular shaped bracket 18 that extends outwardly from the lower end of each of the sections 10. Thus, the sections 10 are free to pivot or swing about a vertical axis extending through the pivot pins 29 and 32 as later described in this application.

A means is provided for causing the sections 10 to swing or pivot in unison, and this means comprises a link 35 which has one end pivotally connected to one of the triangular shaped brackets 18 on a section 10 by means of a pivot pin 36. Extending from the other triangular shaped bracket 18 on the other section 10, is a pair of angularly arranged rigid tongues 37 and 38, and a pivot pin 39 connects the end of the link 35 to the outer junction of the tongues 37 and 38, Figure 1. Thus, when one of the sections 10 swings the other will swing or pivot so that the pair of sections will simultaneously move toward or away from each other.

Secured to the beams 11 of the sections 10, are hooks 40, Figure 1, and hooks 41 are connected to the front end of the base 19. Cables 42 are adapted to extend between the hooks 40 and 41 so that with the sections 10 in the open position of Figure 1, the sections will not accidentally close and the cables 42 will retain the pair of sections in their aligned end to end position as when harrow sections and the like are being dragged across a field of growing crops or the like.

Referring to Figure 10, there is shown a fragmentary portion of the device illustrating a harrow section 13 being transported or carried from place to place. Thus, the harrow section 13 may include frame members 44 and fingers 45 for working the ground. For supporting the harrow section 13, each of the sections 10 may be provided with a plurality of horizontally disposed L-shaped clips or brackets 43 whereby the lower edge of the harrow section 13 will be engaged and supported. Since the triangular sections 10 are provided with the inclined braces 16 and upper rod 15, the harrow section 13 will rest against the braces and rod as shown in Figure 10 whereby these harrow sections can be conveniently transported until they are to be used. Then, the sections 13 can be removed from the position shown in Figure 10 and attached to the drawbar of the present invention, in any suitable manner, as for example by means of chains which can extend rearwardly from the clips 43.

Ground engaging wheels 50 are provided for supporting the folding drawbar and transport, Figures 5, 6 and 7. The mounting for the wheels 50 is adjustable so that the wheels 50 can be used in either of two positions which are 90 degrees apart. The wheel mounting includes for each section 10 a curved rail 46 which has one end secured to the bar 14, while the other end of the rail 46 may be secured to the beam 11. The rail 46 is provided with a longitudinally extending slot or trackway 47, and a bearing block 48 is secured to the bar 12. An axle 49 supports each of the wheels 50, and one end of the axle 49 is connected to the rail 46 by means of a stop pin or bolt 51. A pin or bolt 52 connects the other end of the axle 49 to the bearing block 48. By removing the pin 51, the axle 49 can be swung from the solid line position of Figure 5 to the dotted line position and then a pin can be inserted through an opening 53 to retain the axle in place. The end of the axle 49 is adapted to slide through the trackway 47 in the rail 46, and the rail 46 is horizontally disposed. Thus, the wheel 50 can be positioned so that it lies in a plane that coincides with the longitudinal axis of the sections 10 whether the sections 10 be in the position shown in Figure 1 or whether they be in the position shown in Figure 2. Thus there will be no drag resulting from the wheels being arranged at right angles to the direction of movement of the sections.

From the foregoing it is apparent that there has been provided a folding drag and transport and in use when equipment such as harrow sections are being moved along a field, the parts are in the position shown in Figure 1 so that the pair of sections 10 are in end to end relation with respect to each other. The harrow sections such as the harrow section 13 may be connected to the clips 43 by chains or the like so that when a tractor is attached to the hitch 27' the harrow sections 13 will be pulled along a field whereby the flexible fingers 45 will work the ground efficiently. The cables 42 will prevent accidental collapsing or inward movement of the sections 10. When the device is to be moved to a new location, the parts can be moved to a folded or collapsed position so as to occupy a minimum amount of space and this is accomplished by releasing the cables 42 from the hooks 41 and 40. Then, the bolts 51 are moved from engagement with the axles 49 and rails 46 and the axles 49 and wheels 50 are moved from the position shown in Figure 1 to the position shown in Figure 2. Then, the bolt is inserted through the registering apertures in the axle 49 and 54. A bolt can be extended through these apertures, that is the aperture in the free end of the axle 49 and the aperture 53 in order to retain the wheel and axle in the position shown in Figure 2. If desired a chain or the like can be extended across the rear ends of the sections 10 when the sections are in the position shown in Figure 2 in order to retain the sections in their trailing or closed position.

To cause the sections 10 to move from the position shown in Figure 2 to the position shown in Figure 1, it is only necessary to back up or have the tractor move in reverse whereby the sections 10 will automatically open, the wheels 50 and axles 49 having been previously returned from the position shown in Figure 2 to the position shown in Figure 1. This backward movement of the tractor will cause the sections 10 to move to the end to end aligned relation of Figure 1 and then the cables 42 can be connected to the hooks 40 and 41 to retain the sections in their open or operative position. The link 35 and its pivotal connection causes the pair of sections 10 to open and close simultaneously.

Figure 2 shows the wing sections 10 in trailing position so that the entire device can be moved easily since it is compact and well balanced and also with the parts in this position the device will readily clear or pass through a relatively small opening. To open the wing sections 10 to the position shown in Figure 1, the tractor is merely put in reverse and the wing sections will open automatically and evenly due to the link 35. The tractor is continued backward until the wing sections 10 curve slightly inward and then the cables 42 can be attached to the base 19 and then the harrow sections 13 can be unloaded and attached in the trailing position. Then, the wheels 50 are moved to operating position as shown in Figure 1. The drawbar provides uniform pressure for all harrow sections and rides on the wheels 50 and can be transported easily. The harrow sections 13 can be loaded as shown in Figure 10 for quick transport from one field to another. Since the device rides on the wheels 50, each harrow section will exert uniform pressure and mulch the soil properly. Also, the device can be readily converted from operating to trailing position and back again and there will be increased pull from the drawbar. The harrow sections are attached to the trailing edge of the device at all times whether they are being transported or whether they are in working position. When the harrow sections 13 are not in working position, their lower edges rest on the clips 43. Due to the hinge connection between the sections 10 and the base, the device can be folded to permit movement through restricted openings and the like.

The folding drawbar and transport can be used for pulling several types of field working tools such as drag harrows which may be flexible or rigid, rotary hoes, and the device can also be used as a weed sprayer carrier. A large area can be readily worked. Furthermore, the weight is evenly distributed over the wheels whether the machine is in trailing or carrying position and since the machine has only two wheels it can be moved on roads with ease and high speed, and the wheels can be locked in either of their two positions. The sections 10 are of triangular cross section and the top member 15 acts as a rest for either a flexible section or a rigid section such as a harrow 13.

I claim:

1. In a folding drawbar and transport, a pair of sections of similar construction each including a lower longitudinally extending beam, a pair of aligned bars arranged in the same horizontal plane as said beam and arranged in spaced parallel relation therewith, a plurality of horizontally disposed spaced parallel arms extending between said bars and beam and secured thereto, a horizontally disposed rod arranged above said arms, a plurality of inclined spaced parallel braces extending from said rod to said beam and to said bars and interconnecting the same, a curved rail extending between one of said bars and said beam, a bearing secured to the other of said bars, an axle having one end connected to said bearing and its other end arranged in engagement with said rail, a wheel mounted on said axle, said wheel and axle adapted to be shifted through an angle of 90 degrees, a base positioned between said pair of sections and extending forwardly thereof, said base including a pair of spaced parallel side members, front and rear end members extending between said side members and secured thereto, a crosspiece extending between said side members and secured thereto, inclined fingers extending upwardly from said base, a horizontally disposed body member secured to the upper ends of said fingers, hinges pivotally connecting the ends of said sections to said base, and means interconnecting said sections.

2. The structure as defined in claim 1, wherein said means comprises a triangular shaped bracket secured to the lower inner end of each of said sections, a link having one end pivotally connected to one of said brackets, and tongues secured to the other of said brackets and pivotally connected to the other end of said link.

3. The structure as defined in claim 1, and further including a plurality of L-shaped clips secured to said bars for supporting articles being transported.

4. The folding drawbar and transport as defined in claim 1, and further including a hitch extending forwardly from said base for engagement with a towing vehicle, and cables extending between said sections and base for maintaining the sections in extended position.

5. In a folding drawbar and transport, a pair of sections of similar construction each including a lower longitudinally extending beam, a pair of aligned bars arranged in the same horizontal plane as said beam, a plurality of arms extending between said bars and beam and secured thereto, a rod arranged above said arms, a plurality of braces extending from said rod to said beam and to said bars and interconnecting the same, a rail extending between one of said bars and said beam, a bearing secured to the other of said bars, an axle having one end connected to said bearing and its other end arranged in engagement with said rail, a wheel mounted on said axle, said wheel and axle adapted to be shifted through an angle of 90 degrees, a base positioned between said pair of sections and extending forwardly thereof, said base including a pair of side members, front and rear end members extending between said side members and secured thereto, a crosspiece extended between said side members and secured thereto, fingers extending upwardly from said base, a body member secured to the upper ends of said fingers, hinges pivotally connecting the ends of said sections to said base, and means interconnecting said sections.

References Cited in the file of this patent

UNITED STATES PATENTS

| | | |
|---|---|---|
| 2,597,533 | Rogers | May 20, 1952 |
| 2,599,084 | Archer et al. | June 3, 1952 |
| 2,620,200 | Anderson | Dec. 2, 1952 |
| 2,641,886 | Graham | June 16, 1953 |